(12) United States Patent
Gordon et al.

(10) Patent No.: US 10,968,301 B2
(45) Date of Patent: Apr. 6, 2021

(54) STRESS-RESPONSIVE COMPOSITIONS AND USES THEREOF

(71) Applicants: Melissa B. Gordon, Montvale, NJ (US); Christopher J. Kloxin, Landenberg, PA (US); Norman J. Wagner, Newark, DE (US); Thomas H. Epps, III, Bear, DE (US); Grant Alexander Knappe, Flemington, NJ (US); Shu Wang, Newark, DE (US)

(72) Inventors: Melissa B. Gordon, Montvale, NJ (US); Christopher J. Kloxin, Landenberg, PA (US); Norman J. Wagner, Newark, DE (US); Thomas H. Epps, III, Bear, DE (US); Grant Alexander Knappe, Flemington, NJ (US); Shu Wang, Newark, DE (US)

(73) Assignee: UNIVERSITY OF DELAWARE, Newark, DE (US)

( * ) Notice: Subject to any disclaimer, the term of this patent is extended or adjusted under 35 U.S.C. 154(b) by 103 days.

(21) Appl. No.: 16/326,036

(22) PCT Filed: Aug. 17, 2017

(86) PCT No.: PCT/US2017/047375
§ 371 (c)(1),
(2) Date: Feb. 15, 2019

(87) PCT Pub. No.: WO2018/035342
PCT Pub. Date: Feb. 22, 2018

(65) Prior Publication Data
US 2019/0169340 A1    Jun. 6, 2019

Related U.S. Application Data

(60) Provisional application No. 62/376,087, filed on Aug. 17, 2016.

(51) Int. Cl.
| *C08F 220/18* | (2006.01) |
| *C08F 2/38* | (2006.01) |
| *C08K 5/22* | (2006.01) |
| *C08K 5/3437* | (2006.01) |
| *B33Y 10/00* | (2015.01) |
| *B33Y 70/00* | (2020.01) |
| *B29C 73/18* | (2006.01) |

(52) U.S. Cl.
CPC ............ *C08F 220/18* (2013.01); *B29C 73/18* (2013.01); *B33Y 10/00* (2014.12); *B33Y 70/00* (2014.12); *C08F 2/38* (2013.01); *C08K 5/22* (2013.01); *C08K 5/3437* (2013.01); *C08F 2438/03* (2013.01); *C08F 2810/20* (2013.01)

(58) Field of Classification Search
CPC ............................................... C08F 220/00–20
See application file for complete search history.

(56) References Cited

U.S. PATENT DOCUMENTS

| 2011/0168393 A1 | 7/2011 | Ezell et al. |
| 2013/0269445 A1 | 10/2013 | Chopra et al. |
| 2013/0274412 A1 | 10/2013 | Hickenboth et al. |
| 2014/0227327 A1 | 8/2014 | Bencherif et al. |
| 2016/0009845 A1 | 1/2016 | Gordon et al. |

FOREIGN PATENT DOCUMENTS

WO    2015143258 A1    9/2015

OTHER PUBLICATIONS

International Preliminary Report on Patentability for International Application No. PCT/US2017/047375, dated Feb. 19, 2019—5 pages.
International Search Report and Written Opinion for International Application No. PCT/US2017/047375, dated Nov. 6, 2017—7 pages.
Moad et al., "Living Radical Polymerization by the RAFT Process", Aust. J. Chem., 2005, 58—pp. 379-410.
Moad et al., "Living Radical Polymerization by the RAFT Process—A First Update", Aust. J. Chem., 2006, 59—pp. 669-692.
Moad et al., "Living Radical Polymerization by the RAFT Process—A Second Update", Aust. J. Chem., 2009, 62—pp. 1402-1472.
Moad et al., "Living Radical Polymerization by the RAFT Process—A Third Update", Aust. J. Chem., 2012, 65—pp. 985-1076.
Notification Concerning Transmittal of International Preliminary Report on Patentability for or International Application No. PCT/US2017/047375, dated Feb. 28, 2019—6 pages.

*Primary Examiner* — Wenwen Cai
(74) *Attorney, Agent, or Firm* — RatnerPrestia

(57) ABSTRACT

The present disclosure is directed to stress-responsive compositions comprising (1) at least one (co)polymer comprising at least one mechanophore comprising at least one thiocarbonylthio functional group or derivative thereof and (2) at least one compound comprising at least one functional group capable of reacting with a free radical, The present disclosure is also directed to articles, coatings, and 3D printing binders comprising such stress-responsive compositions, as well as to processes of imparting the abilities of forming and maintaining protective barriers and mechanical self-healing to such articles, coatings, and 3D printing binders by incorporating such stress-responsive compositions therein.

30 Claims, 5 Drawing Sheets

STRESS-RESPONSIVE COMPOSITIONS AND USES THEREOF

RELATED APPLICATIONS

This application is the national phase of International Application No. PCT/US2017/047375, flied Aug. 17, 2017, which claims priority to U.S. Provisional Patent Application Ser. No. 62/376,087, filed Aug. 17, 2016, the disclosures of each of which are hereby incorporated by reference herein in their entirety.

GOVERNMENT LICENSE RIGHTS

This invention was made with government support under Grant No. NNX15AI19H, awarded by the National Aeronautics and Space Administration (NASA). The government has certain rights in the invention.

FIELD OF THE INVENTION

The present disclosure relates generally to stress-responsive compositions comprising (1) at least one (co)polymer comprising at least one mechanophore comprising at least one thiocarbonylthio functional group or derivative thereof and (2) at least one compound comprising at least one functional group capable of reacting with a free radical. The present disclosure is also directed to articles, coatings, and 3D printing binders comprising such stress-responsive compositions, as well as to processes of imparting the abilities of forming and maintaining protective barriers and mechanical self-healing to such articles, coatings, and 3D printing binders by incorporating such stress-responsive compositions therein.

BACKGROUND OF THE INVENTION

Most synthetic polymers fail in response to sustained or increased levels of stress and have no inherent mechanisms to recover, leading to material fatigue and failure and reduced product efficacy and/or compromised user safety. In contrast, many biological systems display a wide range of remarkable responses to mechanical stimuli, including wound healing and bone strengthening. In these examples from nature, repair and/or strengthening mechanisms are initiated by force. These natural force-responsive systems respond constructively on a molecular level to mechanical stimuli by adjusting their properties to meet the demands of a changing environment.

One approach for designing such a stress-responsive material incorporates "mechanophores," or mechanically-sensitive groups, into polymer chains. To date, several cyclic molecules, including spiropyran, β-lactam, 1,2-dioxetane, dicyano-substituted cyclobutane, bicyclo[4.2.0]octane, dibromocyclopropane, 1,2-disubstituted benzocyclobutene, and gem-difluorocyclopropane, have been successfully incorporated into polymer chains and identified as mechanophores, which actively and selectively respond to a traditionally degradative stimulus.

The activation of the mechanophore in materials may be exploited to provide additional responsive functionality. This response can be broad in scope and include a change in color to provide a visual warning of material failure, luminescence to enable the detailed study of material failure, and strengthening to mitigate material failure. In this latter example, mechanical activation of dibromocyclopropane by application of physical force resulted in a nucleophilic displacement crosslinking reaction to form a polybutadiene gel, triggering self-strengthening of the system. However, this gel formation and concomitant self-strengthening did not occur until 16 hours after the force was applied.

Thus, there exists a continuing need for improved polymeric systems capable of self-strengthening and self-healing in response to externally applied stresses.

EMBODIMENTS OF THE INVENTION

This need is met by the stress-responsive compositions of the present invention.

Thus, one embodiment of the present invention is a stress-responsive composition comprising (1) at least one (co)polymer comprising at least one mechanophore and (2) at least one compound comprising at least one functional group capable of reacting with a free radical.

In certain embodiments, the at least one (co)polymer is selected from the group consisting of polystyrenes, polyacrylates, polymethacrylates, polytetrafluoroethylenes, polyvinylchlorides, polyacrylonitriles, polyvinylalcohols, polyvinyl acetates, polyacrylamides, and any copolymers and/or combinations thereof. In certain embodiments, the at least one (co)polymer is a poly[meth]acrylate. In certain embodiments, the at least one (co)polymer is derived from n-butyl acrylate.

In certain embodiments, the at least one mechanophore is a moiety comprising at least one functional group selected from the group consisting of thiocarbonylthio, trithiocarbonate, dithiocarbamate, xanthate, and dithiobenzoate, and any combination thereof. In certain embodiments, the at least one mechanophore is a moiety comprising at least one trithiocarbonate functional group.

In certain embodiments, the at least one compound comprising at least one functional group capable of reacting with a free radical comprises at least one crosslinker. In certain embodiments, the at least one crosslinker is selected from the group consisting of polyfunctional acrylates, polyfunctional methacrylates, mixtures of polythiols and polyfunctional vinyl compounds, and any combination thereof. In certain embodiments, the at least one crosslinker is a polyfunctional acrylate. In certain embodiments, the at least one crosslinker is tetraethylene glycol diacrylate.

In certain embodiments, the at least one compound comprising at least one functional group capable of reacting with a free radical comprises at least one radical indicator. In certain embodiments, the at least one radical indicator is capable of a colorimetric response upon reaction with a free radical. In certain embodiments, the at least one radical indicator is a fluorogenic radical trap or a radical trap capable of eliciting a light absorbance or color shift. In certain embodiments, the at least one radical indicator is selected from the group consisting of 4-((9-acridinecarbonyl)amino)-2,2,6,6-tetramethylpiperidin-1-oxyl free radical, 2,2-diphenyl-1-picrylhydrazyl, and combinations thereof.

In certain embodiments, the at least one mechanophore is a monomer unit in the backbone of the at least one (co)polymer. In certain embodiments, the at least one mechanophore is a monomer unit located at the midpoint of the backbone of the at least one (co)polymer. In certain embodiments, the at least one mechanophore is or is part of a pendant group on the backbone of the at least one (co)polymer. In certain embodiments, the at least one (co)polymer is crosslinked. In certain embodiments, the at least one mechanophore is and/or is part of the crosslink(s) between the (co)polymer backbones.

In certain embodiments, the at least one (co)polymer comprising at least one mechanophore is chemically or physically bonded to a particle. In certain embodiments, the particle is selected from the group consisting of colloidal particles, nanoparticles, fibers, nanocrystalline celluloses, graphene, graphene oxide, carbon black, metal organic frameworks, metal organic polyhedrons, polyhedral oligomeric sisesquioxanes, and any combination thereof.

Another embodiment of the present invention is an article comprising the above stress-responsive composition.

In certain embodiments, the article is selected from the group consisting of protective materials for military, space, and law enforcement applications. In certain embodiments, the articles is selected from the group consisting of helmets, visors, goggles, body armor, space suits, gloves, face masks, boots, and clothing. In certain embodiments, the article is selected from the group consisting of automobile components, contact lenses, clothing, and helmets. In certain embodiments, the article is selected from the group consisting of bladder cloths, bladder textiles, bladder layers, bladder tanks, and bladder devices capable of maintaining a seal or pneumatic pressure difference.

Yet another embodiment of the present invention is a coating comprising the above stress-responsive composition.

Yet another embodiment of the present invention is a 3D printing binder comprising the above stress-responsive composition.

Yet another embodiment of the present invention is a process for imparting the ability of forming and maintaining a protective barrier to an article, coating, or 3D printing binder, comprising adding to the article, coating, or 3D printing binder or manufacturing the article, coating, or 3D printing binder from the above stress-responsive composition.

Yet another embodiment of the present invention is a process for imparting the ability of mechanical self-healing to an article, coating, or 3D printing binder, comprising adding to the article, coating, or 3D printing binder or manufacturing the article, coating, or 3D printing binder from the stress-responsive composition.

Yet another embodiment of the present invention is a process for imparting the ability of detection of material fatigue and/or failure to an article, coating, or 3D printing binder, comprising adding to the article, coating, or 3D printing binder or manufacturing the article, coating, or 3D printing binder from the above stress-responsive composition.

DETAILED DESCRIPTION OF THE INVENTION

Figure 1:
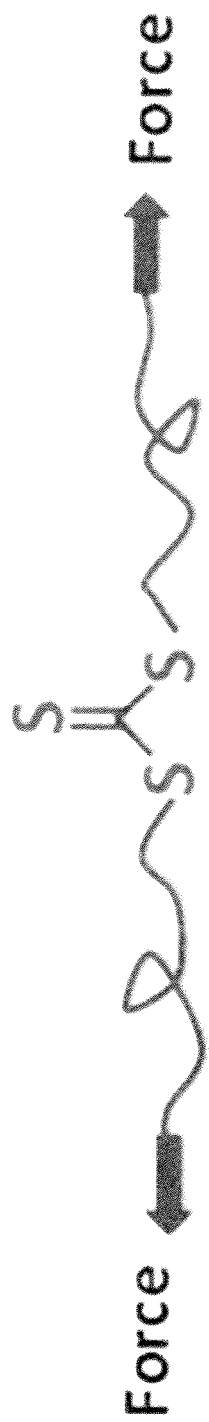
FIG. 1 depicts force propagated along the backbone of a polymer containing a trithiocarbonate (TTC) functional group.

In one aspect of the present invention, the present disclosure provides for a stress-responsive composition comprising (1) at least one (co)polymer comprising at least one mechanophore and (2) at least one compound comprising at least one functional group capable of reacting with a free radical. The stress-responsive compositions according to the present invention can respond to the application of physical stress, stimulus, or force, such as in the form of a physical impact and/or mechanical deformation, such that selective cleavage of a labile carbon-sulfur single bond of the at least one mechanophore to form free radicals is induced. This can trigger a crosslinking polymerization (i.e., a "healing response") when it occurs in the presence of at least one crosslinker within minutes of application of the stress. Alternatively, this free-radical formation can trigger a colorimetric response when it occurs in the presence of a free radical indicator, such as a fluorogenic radical trap or a radical trap capable of eliciting a light absorbance or color shift. Furthermore, so long as there is sufficient compound comprising at least one functional group capable of reacting with a free radical present in the stress-responsive composition according to the present invention, such healing and/or colorimetric responses can be triggered repeatedly. In certain embodiments, the healing response is triggered in less than 10 minutes after application of physical stress, stimulus, or force to the stress-responsive compositions according to the present invention. This amplified mechanochemical activity of the stress-responsive compositions according to the present invention may lead to an increase in its crosslink density and significant changes to its macroscopic bulk properties.

The stress-responsive compositions according to the present invention can comprise any suitable (co)polymer(s) to which at least one mechanophore may be covalently bonded. Examples of such (co)polymers include, but are not limited to, polyolefins, such as low-density polyethylenes, high-density polyethylenes, polypropylenes, polymethylpentenes, polybutene-1s, polyisobutylenes, ethylene propylene rubbers, and ethylene propylene diene monomer rubbers, polystyrenes, acrylonitrile butadiene styrenes, para-aramids, meta-aramids, polyacrylates, polymethacrylates, polytetrafluoroethylenes, polyvinylchlorides, polychlorotrifluoroethylenes, polyacrylonitriles, polyvinylalcohols, polyvinyl acetates, polyamides, polyimides, polyacrylamides, polyurethanes, polyurea urethanes, polyether polyureas, polycarbonates, polyesters, polylactic acids, polyether sulfones, polyoxymethylenes, polyetherether ketones, polyetherimides, polyphenylene oxides, polyphenylene sulfides, polybenzimidazoles, polyacrylonitriles, polyisoprenes, polychloroprenes, polyethylene terephthalates, polysiloxanes, polyphosphazenes, latex, poly(p-phenylene-2,6-benzobisoxazoles and any copolymers and/or combinations thereof. In certain embodiments, the at least one (co)polymer of the stress-responsive composition according to the present invention comprises a poly[meth]acrylate. In certain embodiments, the at least one (co)polymer of the stress-responsive composition according to the present invention is derived from n-butyl acrylate.

As used herein, the term "mechanophore" according to the present invention encompasses any force responsive, mono- or polyvalent moiety covalently bonded to the at least one at least (co)polymer according to the present invention, wherein the moiety comprises at least one thiocarbonylthio functional group or derivative thereof capable of forming a free radical when subjected to mechanical force. Examples of such thiocarbonylthio functional group derivatives include, but are not limited to, trithiocarbonates, dithiocarbamates, xanthates, and dithiobenzoates. In certain embodiments according to the present invention, the mechanophore is a thiocarbonylthio functional group or derivative thereof.

The at least one mechanophore according to the present invention can be derived from any suitable molecule comprising at least one thiocarbonylthio functional group or derivative thereof capable of free radical polymerization. Examples of such molecules comprising at least one thiocarbonylthio functional group or derivative thereof capable of free radical polymerization include, but are not limited to, commercially and non-commercially available RAFT agents. Examples of such RAFT agents from which the at least one mechanophore according to the present invention can be derived include those disclosed in "Living Radical Polymerization by the RAFT Process," by Moad, G., et al., Aust. J. Chem., 2005, 58, 379-410; "Living Radical Polymerization by the RAFT Process—A First Update," by Moad, G., et al., Aust. J. Chem., 2006, 59, 669-692; "Living Radical Polymerization by the RAFT Process—A Second Update," by Moad, G., et al., Aust. J. Chem., 2009, 62, 1402-1472; and "Living Radical Polymerization by the RAFT Process—A Third Update," by Moad, G., et al., Aust. J. Chem., 2012, 65, 985-1076; each of which is incorporated herein by reference in their entireties. In certain embodiments, the at least one mechanophore according to the present invention can be derived from the RAFT agents dibenzyl trithiocarbonate, dimethyl trithiocarbonate, and/or bis(carboxymethyl)trithiocarbonate. The at least one mechanophore according to the present invention can be also be synthesized by reacting thiol functional group containing polymers with isothiocyanate functional group containing polymers to form a dithiocarbamate mechanophore linkage, reacting alcohol functional group containing polymers with carbon disulfide under alkaline conditions to form a xanthate, which is subsequently reacted with a halide-functional polymer to form a xanthate (dithiocarbonate) mechanophore linkage, and reacting an amino (primary or secondary) functional group containing polymer with carbon disulfide under alkaline conditions, the product of which is subsequently reacted with a halide-functional polymer to form a dithiocarbamate mechanophore linkage.

Molecules comprising at least one thiocarbonylthio functional group or derivative thereof capable of free radical polymerization may further comprise at least one functional group capable of forming a covalent bond with the at least one (co)polymer according to the present invention. Examples of such functional groups capable of forming a covalent bond with the at least one (co)polymer according to the present invention include, but are not limited to, hydroxyl groups, primary and secondary amino groups, carboxylic acid groups and derivatives thereof (esters, anhydrides, acid halides, etc.), epoxies, and isocyanates. Examples of polymerization reactions in which such molecules can be employed include, but are not limited to, polymerization of a composition of multifunctional isocyanate group containing monomers with multifunctional alcohol group containing monomers whereas at least one monomer contains a thiocarbonylthio-based functional group to produce a polyurethane with mechanophore functionality, polymerization of a composition of multifunctional amino group containing monomers and multifunctional epoxy group containing monomers whereas at least one monomer contains a thiocarbonylthio-based functional group to produce an epoxy-based (aminoether) polymer with mechanophore functionality, polymerization of a composition of multifunctional alcohol group containing monomers with phosgene whereas at least one monomer contains a thiocarbonylthio functional group to produce a polycarbonate with mechanophore functionality, and polymerization of a composition of multifunctional amino group containing monomers and multifunctional acid chloride group containing monomers whereas at least one monomer contains a thiocarbonylthio-based functional group to produce a polyamide with mechanophore functionality. The at least one (co)polymer according to the present invention can be linear or branched. In certain embodiments where the at least one (co)polymer is branched, the at least one branched (co)polymer may be in the form of a star-shaped (co)polymer, a comb (co)polymer, a brush (co)polymer, a dendrimer, or a (co)polymer network (i.e., a crosslinked (co)polymer). In any of these embodiments, the at least one mechanophore according to the present invention can be covalently attached to the at least one (co)polymer as a monomer unit in the (co)polymer backbone and/or grafted to the (co)polymer backbone as (or as part of) a pendant group. In certain embodiments where the at least one (co)polymer according to the present invention is crosslinked, the at least one mechanophore may constitute or be part of the crosslinks between the backbones of the (co)polymer. Stresses acting on a polymer chain are a function of molecular mass and are greatest at the midpoint of the (co)polymer backbone. Thus, the position of the mechanophore within the (co)polymer chain and the molecular mass of the (co)polymer chain are important design considerations for mechanophore cleavage. Therefore, in certain embodiments, the at least one mechanophore is located in the midpoint of the backbone of the at least one (co)polymer according to the present invention.

The at least one (co)polymer comprising at least one mechanophore according to the present invention can be synthesized in any suitable manner known in the art. In certain embodiments, the at least one (co)polymer comprising at least one mechanophore according to the present invention can be prepared in one step by RAFT polymerization using a RAFT agent, whereby the at least one mechanophore in the (co)polymer is derived from the RAFT agent used. For example, butyl acrylate can be polymerized using the RAFT agent dibenzyl trithiocarbonate as the chain transfer agent in the presence of a free-radical initiator, such as azobisisobutyronitrile (AIBN), to provide a poly(butyl acrylate) having a trithiocarbonate functional group at the midpoint of the polymer backbone, as depicted in Scheme 1:

Scheme1:

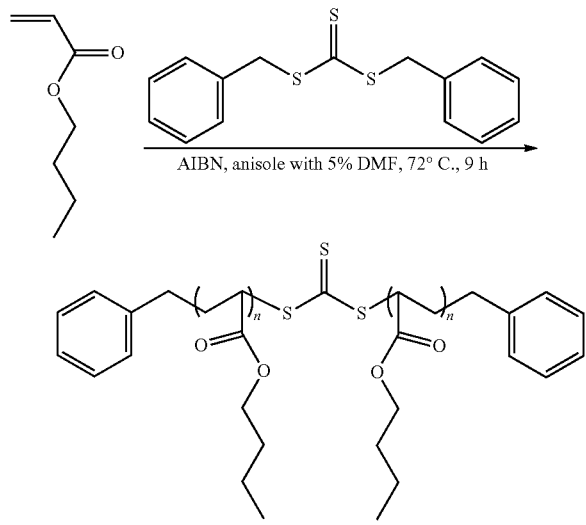

RAFT polymerization, being a controlled radical polymerization, allows for control of the molecular weight and polydispersity index of the resulting (co)polymer. In certain other embodiments, the at least one (co)polymer comprising at least one mechanophore according to the present invention can also be synthesized using non-free radical polymerization methodologies. In such embodiments, molecules comprising at least one thiocarbonylthio functional group or derivative thereof capable of free radical polymerization and which comprise at least two functional groups capable of forming a covalent bonds may be used as co-monomers in a non-free radical polymerization. For example, a RAFT agent that, in addition to having at least one thiocarbonylthio functional group or derivative thereof, comprises at least two hydroxyl groups can be polymerized with one or more polyisocyanates (such as hexamethylene diisocyanate) and, optionally, one or more additional polyols (such as triethanolamine) to form a (co)polyurethane comprising a plurality of thiocarbonylthio functional groups or thiocarbonylthio functional group derivatives in the (co)polymer backbone. In certain other embodiments, the at least one mechanophore can be introduced onto a preexisting polymer as a pendant group on the (co)polymer backbone or as a crosslink in a (co)polymer network. In the former embodiments, a molecule comprising at least one thiocarbonylthio functional group or derivative thereof and further comprising at least one functional group capable of reacting with and forming a covalent bond with a functional group on the preexisting (co)polymer can be used. In the latter embodiments, a molecule comprising at least one thiocarbonylthio functional group or derivative thereof and further comprising at least two functional groups capable of reacting with and forming covalent bonds with functional groups on the preexisting (co)polymer can be used.

The at least one (co)polymer comprising at least one mechanophore according to the present invention can be of any suitable molecular weight that facilitates the cleavage of a labile carbon-sulfur single bond in the mechanophore to form stress-induced free radicals. In certain embodiments, the molecular weight of the at least one (co)polymer comprising at least one mechanophore is at least 10 kDa. In certain embodiments, the molecular weight of the at least one (co)polymer comprising at least one mechanophore is at least 100 kDa. In certain embodiments, the molecular weight of the at least one (co)polymer comprising at least one mechanophore is in the range of from 10 kDa to 1000 kDa. In certain other embodiments, the molecular weight of the at least one (co)polymer comprising at least one mechanophore is in the range of from 100 kDa to 1000 kDa. Examples of such molecular weights include, but are not limited to 10 kDa, 15 kDa, 20 kDa, 25 kDa, 30 kDa, 35 kDa, 40 kDa, 45 kDa, 50 kDa, 55 kDa, 60 kDa, 65 kDa, 70 kDa, 75 kDa, 80 kDa, 85 kDa, 90 kDa, 95 kDa, 100 kDa, 105 kDa, 110 kDa, 115 kDa, 120 kDa, 125 kDa, 130 kDa, 135 kDa, 140 kDa, 145 kDa, 150 kDa, 155 kDa, 160 kDa, 165 kDa, 170 kDa, 175 kDa, 180 kDa, 185 kDa, 190 kDa, 195 kDa, and 200 kDa.

The at least one compound comprising at least one functional group capable of reacting with a free radical according to the present invention can comprise at least one crosslinker and/or at least one radical indicator. The crosslinker according to the present invention can be any suitable molecule comprising at least two groups, such as olefin groups, capable of free radical polymerization (i.e., the molecule is polyfunctional as to groups capable of free radical polymerization). In certain embodiments according to the present invention, the at least two groups capable of free radical polymerization are vinyl groups. Examples of such crosslinkers include, but are not limited to, polyfunctional acrylates and polyfunctional methacrylates. In certain embodiments, the at least one crosslinker is tetraethylene glycol diacrylate. In certain embodiments according to the present invention, a molecule comprising at least two olefin groups capable of free radical polymerization (e.g., a polyfunctional vinyl compound) can be in an admixture with a molecule comprising at least two thiol functional groups (i.e., a polythiol) so as to facilitate a thiol-ene reaction during crosslinking. An example of such an admixture includes, but is not limited to, an admixture of tetraethyleneglycol divinyl ether with a tetrathiol. The- radical indicators according to the present invention can be any suitable fluorogenic radical traps or other free radical responsive indicators, such as a radical trap capable of eliciting a light absorbance or color shift, for use as sensors. These sensors could facilitate the early detection of material fatigue and/or failure and/or further understanding of how damage initiates and propagates throughout a material before catastrophic failure. Examples of such radical indicators include, but are not limited to, 4-((9-acridinecarbonyl)amino)-2,2,6,6-tetramethylpiperidin-1-oxyl free radical, 2,2-diphenyl-1-picrylhydrazyl.

The stress-responsive compositions according to the present invention can be prepared using any suitable method known in the art. In certain embodiments, the stress-responsive compositions according to the present invention can be prepared by simply physically mixing the at least one (co)polymer comprising at least one mechanophore with the at least one crosslinker. The final modulus of the at least one (co)polymer comprising at least one mechanophore, after reaction with the at least one crosslinker, can be precisely tuned for a particular application through the selection of the initial crosslinker concentration.

In certain embodiments, the at least one (co)polymer comprising at least one mechanophore according to the present invention is covalently (including coordinate covalently) or non-covalently bonded to a particle. In certain embodiments where the at least one (co)polymer comprising at least one mechanophore is non-covalently bonded to a particle, the non-covalent bonds can be in the form of dipole-dipole interactions, such as hydrogen bonds, Van der Waals forces, cation-pi interactions, or ionic bonds. The at least one (co)polymer comprising at least one mechanophore can be covalently or non-covalently bonded to the surface and/or the interior of the particle. Examples of such particles includes, but is not limited to, colloidal particles, nanoparticles, fibers, nanocrystalline celluloses, graphene, graphene oxide, carbon black, metal organic frameworks, metal organic polyhedrons, and polyhedral oligomeric sisesquioxanes.

In certain embodiments, stress types include those associated with outer space. Outer space is an extreme environment and material integrity is vital. The main challenge is the presence of millions of particles, i.e., micrometeorites and orbital debris (MMOD), which are moving in space at hypervelocity speeds of 10 km/s or 22,000 mi/hr. MMOD of less than 1 cm in diameter can cause pinhole punctures, which can compromise the air barrier of space suits and habitats, and rough exterior walls. MMOD of 1 to 10 cm in diameter cannot be easily tracked, but can cause catastrophic failure upon impact. New protective materials that constructively respond to small punctures and leaks in space suits and habitats, resulting in improved safety and reliability are required for further space exploration and longer missions. Envisioned materials are flexible, light weight, and offer enhanced protection. These self-healing (autonomous healing) materials recover their functionality after damage, reducing waste and improving the environmental sustainability of the material.

In another aspect of the present invention, the stress-responsive compositions according to the present invention can be used to manufacture, in whole or in part, various articles, responsive coatings, and 3D printing binders for the purpose of imparting the abilities of forming and maintaining a protective barrier and mechanical self-healing thereto. Integrating the stress-responsive compositions according to the present invention into binders for 3D printing, in which elongational flows from the inkjet head result in high forces, may enable new manufacturing processes with enhanced precision and reduced energy costs. In certain embodiments, the stress-responsive compositions according to the present invention can be used in the manufacture of protective materials for military, space, and law enforcement applications. Examples of such protective materials include, but are not limited to, helmets, visors, goggles, body armor, space suits, gloves, face masks, boots, and clothing. Examples of articles of particular use in space applications that may be manufactured, in whole or in part, from the stress-responsive compositions according to the present invention include, but are not limited to, components of inner and outer layers of space suits and habitats, such as bladder cloths, bladder textiles, bladder layers (such as, e.g., the back side of bladder layers), bladder tanks, and bladder devices capable of maintaining a seal or pneumatic pressure difference. In certain other embodiments, the stress-responsive compositions according to the present invention can be used in the manufacture of protective materials for civilian applications, examples of which include, but are not limited to, automobile components, contact lenses, clothing, and helmets. In certain embodiments, the stress-responsive compositions according to the present invention can be used as regenerative polymers in oil recovery and/or transport.

The following examples are included to demonstrate preferred embodiments. It should be appreciated by those of skill in the art that the techniques disclosed in the examples which follow represent techniques discovered by the inventor to function well in the practice of the products, compositions, and methods described herein, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

EXAMPLES

Example 1

Synthesis of Trithiocarbonate (TTC) Functional Group-Containing Polymer

A polymer containing a trithiocarbonate (TTC) functional group was synthesized through a one-step RAFT polymerization. Dibenzyl trithiocarbonate (CAS: 26504-29-0) was purchased from Sigma Aldrich and used as received. n-Butyl acrylate (CAS: 141-32-2) also was purchased from Sigma Aldrich and passed through a basic alumina column to remove the inhibitor before use. 2,2'-Azobisisobutyronitrile (AIBN; CAS: 78-67-1) was purchased from Sigma Aldrich and recrystallized twice from methanol before use. The dibenzyl trithiocarbonate, n-butyl acrylate, and AIBN were dissolved in an anisole solution containing 5 weight % DMF at the concentrations provide below in Table 1. The mixture was transferred into a Schlenk tube equipped with a stir bar and stopcock, which was degassed by three freeze-thaw-pump cycles. The Schlenk tube was filled with argon (3-4 psig) and heated in an oil bath at 72° C. for the time indicated in Table 1. The reaction mixture was diluted with THF (2-fold dilution) and precipitated in a methanol/water (60/40, v/v) mixture (10-fold dilution). The upper clear layer of solution was decanted, and the polymer was collected and dried under vacuum for 2 days. The molecular mass of the polymers were determined by GPC in THF using polystyrene standards. The polymerizations of n-butyl acrylate using the difunctional trithiocarbonate RAFT agent dibenzyl trithiocarbonate produces a polymer chain with the TTC functional group located at the midpoint of the polymer backbone (FIG. 1). Two poly(butyl acrylates) (PBA; 162 kDa and 124 kDa) without a mechanophore were used as control samples. The PBAs were purchased from Polymer Source and used as received.

TABLE 1

Concentrations and Reaction Conditions with Corresponding Polymer Properties
(M: monomer, CTA: chain transfer agent, S: solvent; $M_{n,calc}$: molecular mass
calculated based on conversion (determined by $^1$H NMR), Đ: dispersity):

| Polymer | $[M]_0/[CTA]_0/$ $[AIBN]_0$ (mol/mol/mol) | $[S]/[M]_0$ (wt/wt) | Time (h) | Conv. | $M_{n,calc}$ (kDa) | $M_{n,GPC}$ (kDa) | $M_{w,GPC}$ (kDa) | Đ |
|---|---|---|---|---|---|---|---|---|
| 54 kDa | 506/1/0.12 | 0.5/1 | 5 | 95% | 62.0 | 54.1 | 62.0 | 1.15 |
| 130 kDa | 1658/1/0.10 | 1/1 | 8 | 79% | 168.2 | 130.0 | 165.7 | 1.27 |

Example 2

Radical Trap Experiments

The extent of mechanically-induced polymer scission was evaluated by terminating or 'trapping' the radicals produced via sonication. 10 mL solutions containing 0.1 weight % of a TEMPO radical trap (Sigma Aldrich; CAS: 2564-83-2) and 0.5 weight % of the 130 kDa TTC-containing polymer from Example 1 were prepared using butylated hydroxytoluene (BHT)-free THF (Fisher; CAS: 109-99-9). The solutions were maintained in an ice bath and sonicated under continuous nitrogen flow (0.05 SCFH) using a 13 mm diameter probe and a Model W-225R sonicator from Heating Systems Ultrasonics, Inc. (200 W; 20% amplitude; 20 kHz). The solutions were sonicated to generate large enough forces to cleave the polymer chains, a process typically employed in mechanochemical studies, in which sonic energy is used to produce small bubbles that subsequently collapse, generating shear forces capable of cleaving the polymer chains. The solutions were sonicated continuously for 20 min while on an ice bath (to minimize any heat effects), all under continuous nitrogen flow. In the presence of sonicating energy, the TTC-containing polymer cleaved homolytically at the carbon-sulfur TTC bond, thereby producing radicals, which were sequestered by the radical trap (FIG. 2A). This homolytic cleavage event generated radicals capable of initiating a subsequent radical polymerization (FIG. 2A). The response of TTC-containing PBAs was compared with a 0.5 weight % solution of PBA control polymer not possessing the TTC central unit (Mn of 124 kDa; D=1.15).

Gel permeation chromatography (GPC) traces of the polymers with and without the TTC functional group are shown in FIG. 2B and FIG. 2C, respectively. The GPC traces of the synthesized polymer containing the TTC moiety before (black solid line) and after (blue dashed line) sonication are displayed in FIG. 2B, where it was observed that the sonicated polymer is approximately one-half of the molecular mass of the parent molecule. As the extent of mechanically-induced chain scission is related to the degree of polymerization, sonication of the poly(n-butyl acrylate) (PBA) with a sufficient molecular mass homolytically cleaves or "activates" the TTC group, exhibiting amplified chain cleavage compared to the PBA control polymer of similar molecular mass which does not contain the TTC moiety (FIGS. 2B and 2C). As expected, some cleavage of the control polymer under the same conditions was observed (FIG. 2C). However, the extent of cleavage of the polymer containing the TTC functional group was substantially greater. Moreover, enhanced cleavage of the 130 kDa polymer containing the TTC moiety was observed even when compared to the scission of a second, larger molecular mass PBA control polymer (Mn of 162 kDa) subjected to the same sonication conditions.

The extent of bond cleavage is a function of sonication time. The temporal evolution of the force-induced cleavage shown above is illustrated in FIGS. 3A and 3B for the polymers with and without the TTC functional group, respectively. The evolution in molecular mass in response to sonication forces was evaluated by fitting a logarithmically-transformed Gaussian function to each GPC trace. Consistent with the results of shown in FIG. 2C, continuous sonication of the TTC-containing PBA revealed an accelerated rate of bond cleavage compared to the control PBA (FIG. 3C). Following this analysis, the molecular mass after 16 minutes of sonication was approximately half the starting molecular mass, indicating that 16 minutes of sonication is sufficient to cleave the chains at the carbon-sulfur single bond of the TTC group. As evidenced by the GPC trace at 32 minutes, applying additional sonication led to further cleavage of the polymer chain fragments (likely higher molecular mass chains at the high-end tail of the molecular mass distribution).

In addition to sonication time, the extent of polymer scission depends on polymer molecular mass, as a TTC-containing polymer of lower molecular mass ($M_n$ of 54 kDa) exhibited little to no mechanically-induced cleavage under the same sonication conditions (FIG. 3D), thus placing a lower bound on the molecular mass required to activate the TTC moiety. Moreover, this result confirms force-induced cleavage as the mechanism of breakage, since no dependence on molecular mass is observed in heat- or light-triggered processes. Overall, these results demonstrate that the TTC moiety enhances the mechanochemical response of the polymer by amplifying chain breakage in response to force.

Example 3

Gelation Experiments

Figure 5:
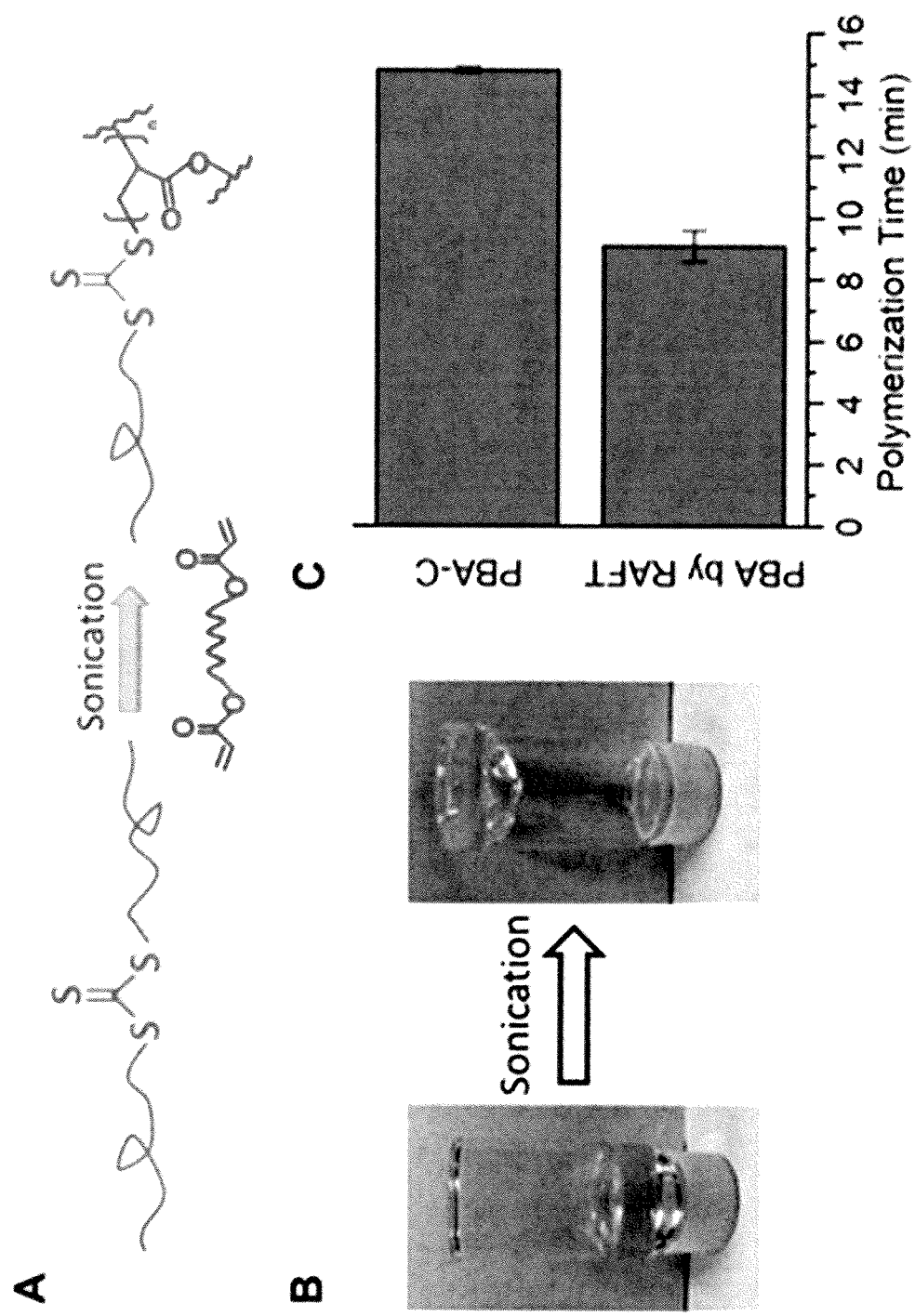
FIG. 5A schematically depicts free-radical polymerization of free radicals generated by sonication of a TTC-containing, force responsive polymer with diacrylates.
FIG. 5B photographically depicts inverted vials indicating the gel formation after sonicating liquid solutions of TTC-containing PBA and PBA control containing no TTC functional groups.
FIG. 5C graphically depicts a comparison of the time to initiation of gel formation of 130 kDa TTC-containing PBA to PBA control containing no TTC functional groups as a result of sonication. The error bars represent standard error of the mean.

To engineer a healing response to mechanical stress, chain cleavage was coupled to a subsequent polymerization reaction to enhance the bulk properties of the material. Instead of trapping the radicals with TEMPO as done in Example 2, diacrylate monomers, which are capable of forming a cross-linked network in the presence of radicals, were incorporated into the polymer solution (FIG. 5A). All solutions (10 mL) were prepared using BHT-free THF (Fisher; CAS: 109-99-9). TEGDA (TCI America; CAS: 17831-71-9) was passed through a basic alumina plug to remove inhibitor before use. For the thiol-ene polymerization, PETMP (Evan's Chemetics; CAS: 7575-23-7; 18 weight %) and TEGDVE (Sigma Aldrich; CAS: 765-12-8; 15 weight %) were used as received. The solutions were maintained in an ice bath and continuously sonicated using the same sonicator and probe as used in Example 2 until gelation. Nitrogen was bubbled through the solution for the duration of the experiment (1 SCFH).

Polymer solutions containing 20 weight % tetraethylene glycol diacrylate (TEGDA) and 0.5 weight % TTC-containing PBA ($M_n$ of 130 kDa) dissolved in THF were sonicated on ice under continuous nitrogen flow, which triggered gel formation within 10 minutes (FIG. 5B). While it was expected that the control polymer ($M_n$ of 124 kDa) would also initiate gel formation given the partial bond cleavage shown above, the rate of gel formation was notably faster for the TTC-containing polymer. In particular, sonication of the 130 kDa TTC-containing PBA triggered gel formation in 9.1±0.5 minutes, while sonication of the control polymer initiated gel formation in 14.8±0.1 minutes (FIG. 5C). This result is consistent with the accelerated cleavage associated with the TTC-containing PBA (FIGS. 2 and 3) and demonstrates that the TTC-containing polymer is more efficient at initiating a healing response via crosslinking compared to the control polymer. To determine if there were any thermal effects resulting from sonication, a control experiment was performed in which a small molecule TTC analogue (i.e., dibenzyl trithiocarbonate) was dissolved in solution with TEGDA and subjected to the same sonication conditions. As expected, no gelation occurred, thereby confirming the mechanical origin of the crosslinking.

Moreover, it should be noted that these polymers can potentially initiate any radical-based polymerization reaction. For example, dissolving the stress-responsive polymer in solution with a divinyl ether (triethylene glycol divinyl ether; TEGDVE; 15 weight %) and a tetra-thiol (pentaerythritol tetra (3-mercaptopropionate); PETMP; 18 weight %) monomers, resulted in gelation via a thiol-ene polymerization after sonication.

Example 4

Light Experiments

For comparison, a sample of the 130 kDa TTC-containing polymer from Example 1 was exposed to UV light, which is known to cleave the carbon-sulfur single bond. Solutions were prepared as described above in Example 2 and irradiated with 26 mW/cm² of 365 nm light for 4 h. GPC analysis revealed a similar reduction in the molecular mass and confirmed that the cleavage occurs at the midpoint of the polymer backbone.

Example 5

Secondary Control in Radical Trap Experiments

Figure 2:
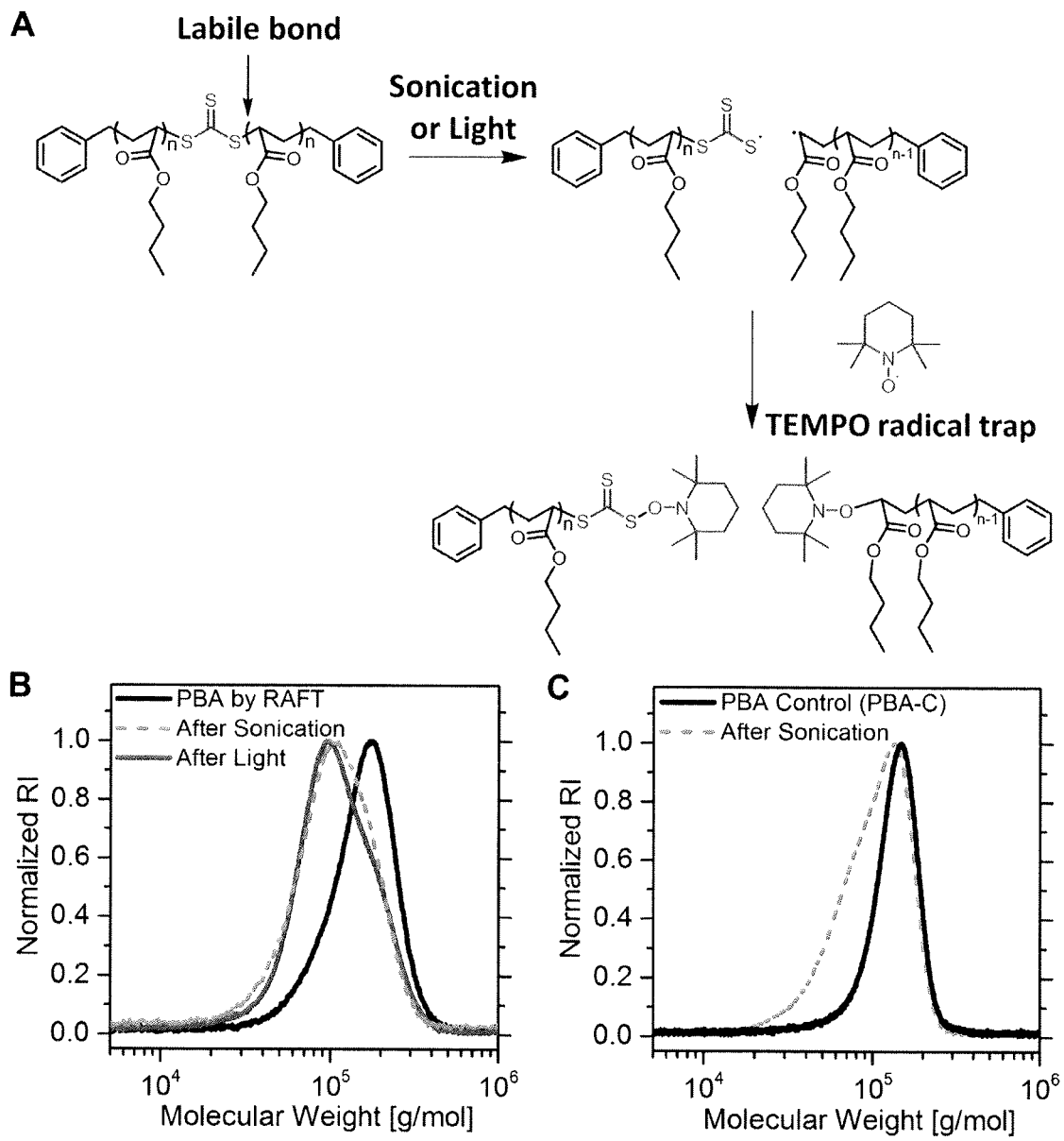
FIG. 2A schematically depicts the cleavage of the labile carbon-sulfur single bond of the TTC functional group of a TTC-containing poly(butyl acrylate) (PBA) to form free-radicals, which subsequently react with TEMPO radical traps to prevent recombination or other side reactions.
FIG. 2B depicts a normalized gel permeation chromatography (GPC) trace of a PBA control containing no TTC functional groups before and after sonication.
FIG. 2C depicts a normalized GPC trace of a TTC-containing PBA before and after sonication and before and after exposure to UV light.
Figure 3:
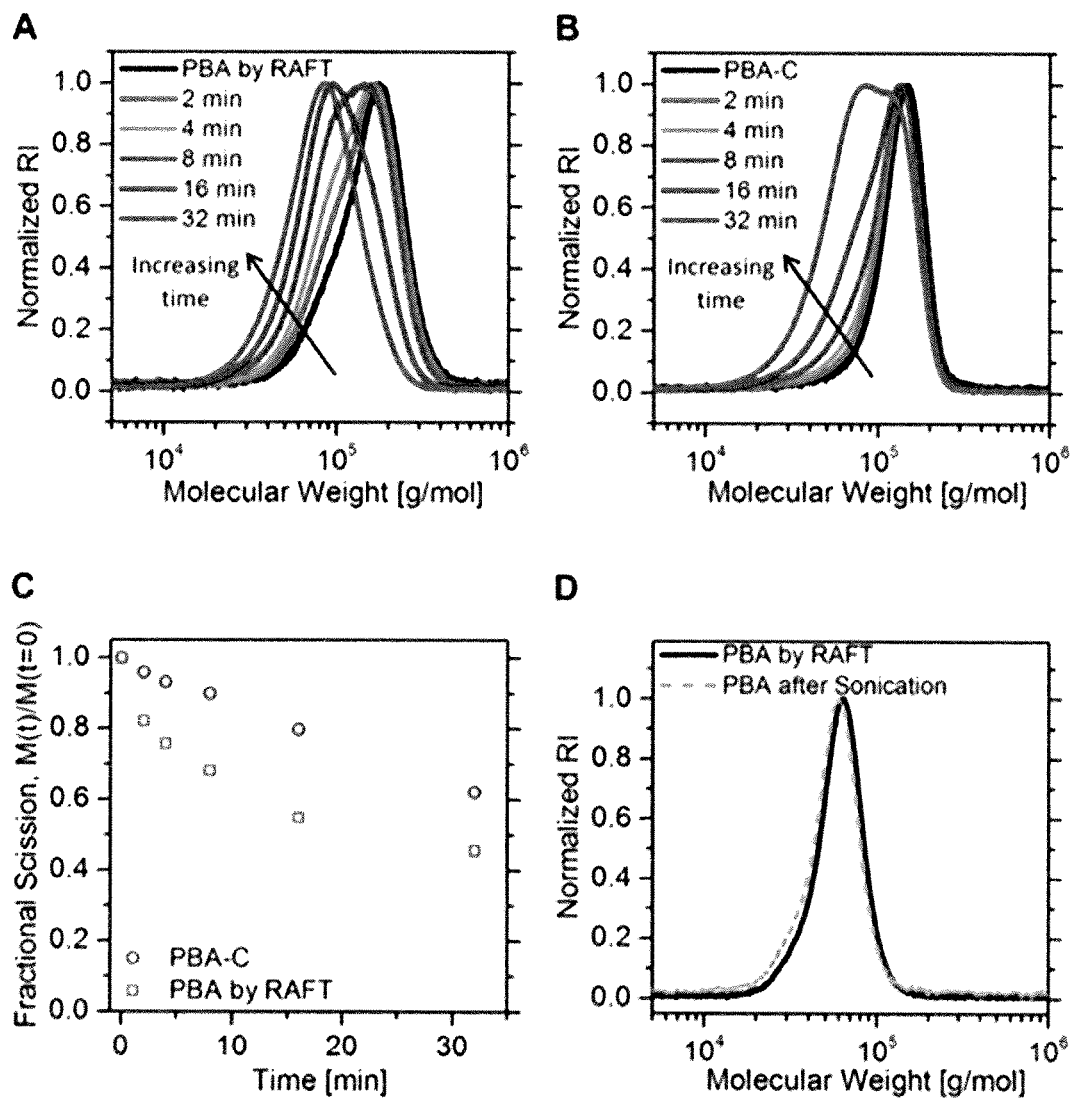
FIG. 3A depicts a normalized GPC trace of a TTC-containing PBA (molecular mass 130 kDa) illustrating the time-evolution of carbon-sulfur single bond cleavage during sonication.
FIG. 3B depicts a normalized GPC trace of a PBA control containing no TTC functional groups (molecular mass 124 kDa) illustrating the time-evolution of carbon-sulfur single bond cleavage during sonication.
FIG. 3C graphically depicts a comparison of the time-evolutions of carbon-sulfur single bond cleavage during sonication of the TTC-containing PBA of FIG. 3A and the PBA control containing no TTC functional groups of FIG. 3B.
FIG. 3D depicts a normalized GPC trace of a TTC-containing PBA of lower molecular mass (54 kDa) illustrating the time-evolution of carbon-sulfur single bond cleavage during sonication.
Figure 4:
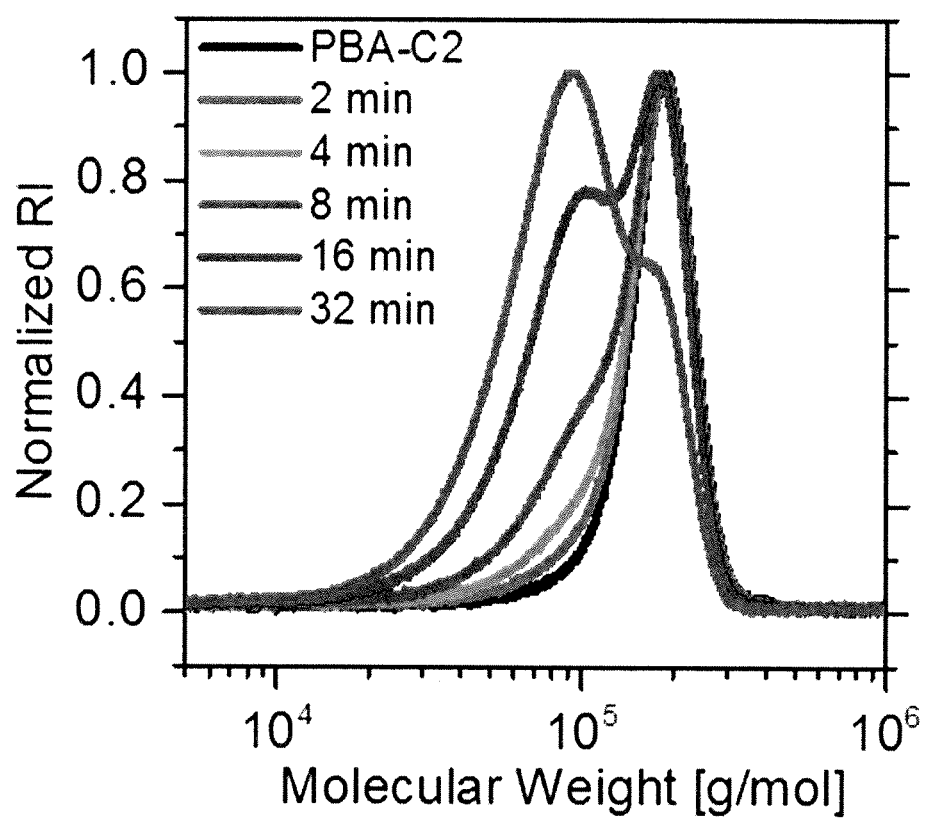
FIG. 4 depicts a normalized GPC trace of a PBA control containing no TTC functional groups of higher molecular mass (162 kDa) illustrating the time-evolution of carbon-sulfur single bond cleavage during sonication.

FIG. 2 compares the TTC-containing polymer having an Mn of 130 kDa to a control polymer of similar molecular mass (i.e., Mn of 124 kDa). Recognizing that polymer cleavage is a function of molecular mass and that there is a small (6 kDa) discrepancy in molecular mass between the TTC-containing polymer and control shown in FIG. 2, a solution containing a secondary PBA control polymer (i.e., not possessing the central TTC moiety) of higher molecular mass (Mn of 162 kDa) was subjected to the same sonication conditions as the polymers shown in FIG. 2 to further assess the effect of the central TTC moiety on chain cleavage. As shown in FIG. 4, this secondary control polymer also exhibited reduced cleavage during sonication compared to TTC-containing polymer (FIG. 2), further confirming the enhanced chain scission imparted by the TTC moiety in response to sonic forces.

The invention claimed is:

1. A stress-responsive composition comprising (1) at least one (co)polymer comprising at least one mechanophore and (2) at least one compound comprising at least one functional group capable of reacting with a free radical, wherein the at least one mechanophore comprises at least one functional group selected from the group consisting of thiocarbonylthio, trithiocarbonate, dithiocarbamate, xanthate, dithiobenzoate, and any combination thereof.

2. The stress-responsive composition of claim 1, wherein the at least one compound comprising at least one functional group capable of reacting with a free radical comprises at least one crosslinker.

3. The stress-responsive composition of claim 1, wherein the at least one compound comprising at least one functional group capable of reacting with a free radical comprises at least one free radical indicator.

4. The stress-responsive composition of claim 1, wherein the at least one (co)polymer is selected from the group consisting of polystyrenes, polyacrylates, polymethacrylates, polytetrafluoroethylenes, polyvinylchlorides, polyacrylonitriles, polyvinylalcohols, polyvinyl acetates, polyacrylamides, copolymers thereof, and combinations thereof.

5. The stress-responsive composition of claim 1, wherein the at least one (co)polymer is a poly[meth]acrylate.

6. The stress-responsive composition of claim 1, wherein the at least one (co)polymer is derived from n-butyl acrylate.

7. The stress-responsive composition of claim 1, wherein the at least one mechanophore comprises a trithiocarbonate functional group.

8. The stress-responsive composition of claim 2, wherein the at least one crosslinker is selected from the group consisting of polyfunctional acrylates, polyfunctional methacrylates, mixtures of polythiols and polyfunctional vinyl compounds, and any combination thereof.

9. The stress-responsive composition of claim 2, wherein the at least one crosslinker is a polyfunctional acrylate.

10. The stress-responsive composition of claim 2, wherein the at least one crosslinker is tetraethylene glycol diacrylate.

11. The stress-responsive composition of claim 3, wherein the at least one radical indicator is capable of a colorimetric response upon reaction with a free radical.

12. The stress-responsive composition of claim 3, wherein the at least one radical indicator is a fluorogenic radical trap or a radical trap capable of eliciting a light absorbance or color shift.

13. The stress-responsive composition of claim 3, wherein the at least one radical indicator is selected from the group consisting of 4-((9-acridinecarbonyl)amino)-2,2,6,6-tetramethylpiperidin-1-oxyl free radical, 2,2-diphenyl-1-picrylhydrazyl, and combinations thereof.

14. The stress-responsive composition of claim 1, wherein the at least one mechanophore is a monomer unit in the backbone of the at least one (co)polymer.

15. The stress-responsive composition of claim 1, wherein the at least one mechanophore is a monomer unit located at the midpoint of the backbone of the at least one (co)polymer.

16. The stress-responsive composition of claim 1, wherein the at least one mechanophore is or is part of a pendant group on the backbone of the at least one (co)polymer.

17. The stress-responsive composition of claim 1, wherein the at least one (co)polymer is crosslinked.

18. The stress-responsive composition of claim 17, wherein the at least one mechanophore is and/or is part of crosslink(s) present in the at least one (co)polymer which is crosslinked.

19. The stress-responsive composition of claim 1, wherein the at least one (co)polymer comprising at least one mechanophore is covalently or non-covalently bonded to the exterior of a particle.

20. The stress-responsive composition of claim 19, wherein the particle is selected from the group consisting of colloidal particles, nanoparticles, fibers, nanocrystalline celluloses, graphene, graphene oxide, carbon black, metal organic frameworks, metal organic polyhedrons, polyhedral oligomeric sisesquioxanes, and any combination thereof.

21. An article comprising the stress-responsive composition of claim 1.

22. The article of claim 21, wherein the article is selected from the group consisting of protective materials for military, protective materials for space, and protective materials for law enforcement applications.

23. The article of claim 21, wherein the article is selected from the group consisting of helmets, visors, goggles, body armor, space suits, gloves, face masks, boots, and clothing.

24. The article of claim 21, wherein the article is selected from the group consisting of automobile components, contact lenses, clothing, and helmets.

25. The article of claim 21, wherein the article is selected from the group consisting of bladder cloths, bladder textiles, bladder layers, bladder tanks, and bladder devices capable of maintaining a seal or pneumatic pressure difference.

26. A coating comprising the stress-responsive composition of claim 1.

27. A 3D printing binder comprising the stress-responsive composition of claim 1.

28. A process for imparting the ability of forming and maintaining a protective barrier to an article, coating, or 3D printing binder, comprising adding to the article, coating, or 3D printing binder the stress-responsive composition of claim 1.

29. A process for imparting the ability of mechanical self-healing to an article, coating, or 3D printing binder, comprising adding to the article, coating, or 3D printing binder the stress-responsive composition of claim 1.

30. A process for imparting the ability of detection of material fatigue and/or failure to an article, coating, or 3D printing binder, comprising adding to the article, coating, or 3D printing binder the stress-responsive composition of claim 1.

\* \* \* \* \*